Aug. 31, 1948.  J. J. WALLACE  2,448,335
ACCOMODATION LADDER FOR SHIPS
Filed June 27, 1945  6 Sheets-Sheet 1

INVENTOR.
John J. Wallace
BY John H. Ruckman
Attorney

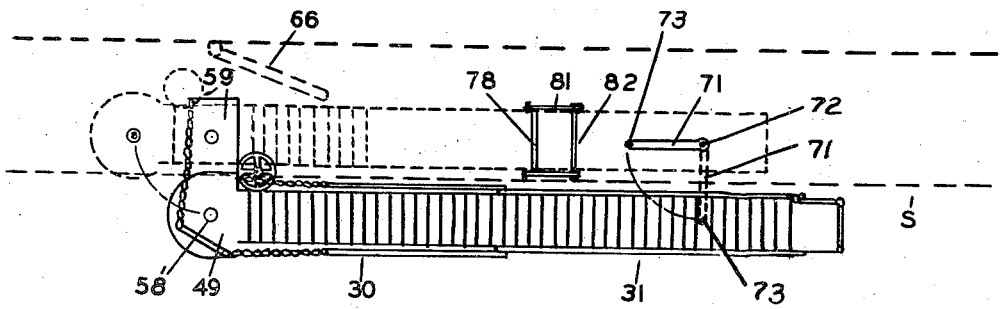
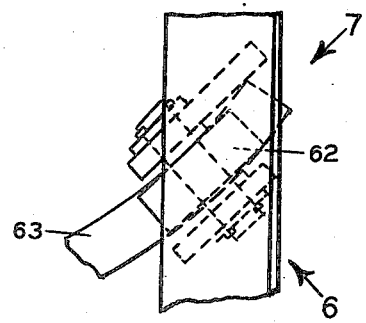
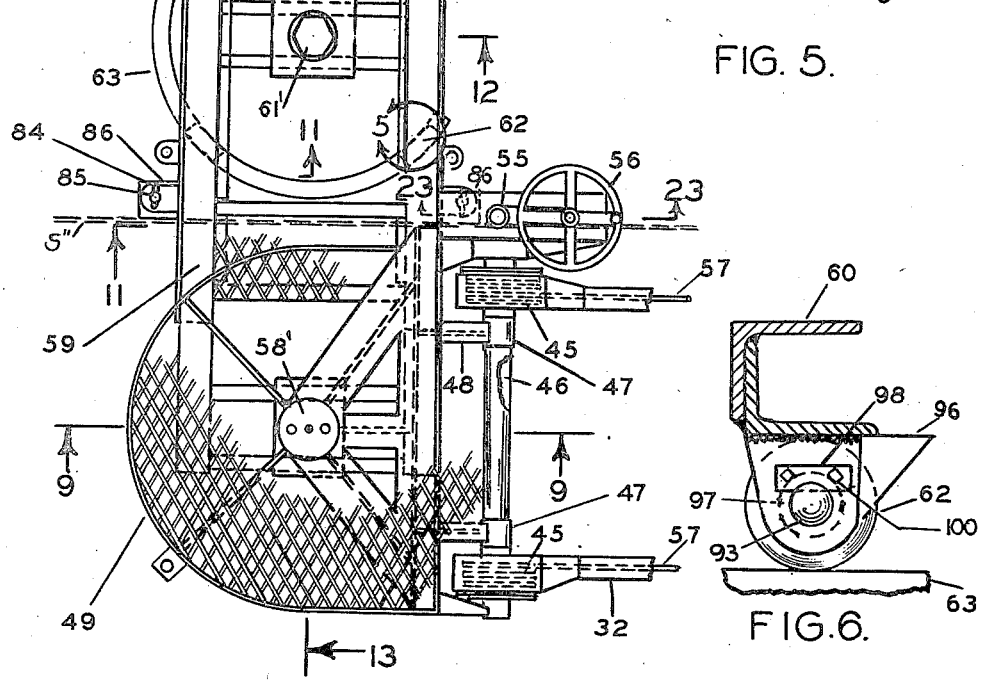

Aug. 31, 1948. J. J. WALLACE 2,448,335
ACCOMODATION LADDER FOR SHIPS
Filed June 27, 1945 6 Sheets-Sheet 4
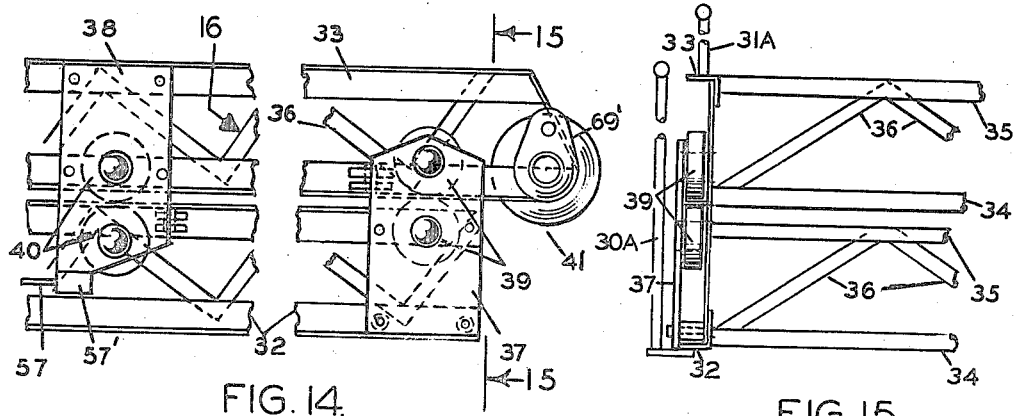
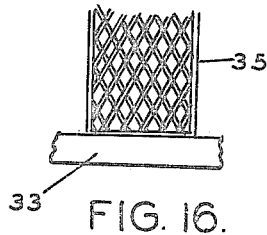
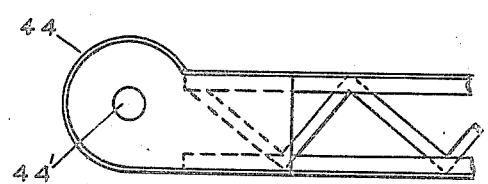
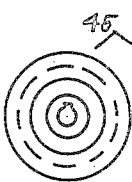
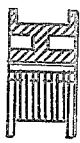
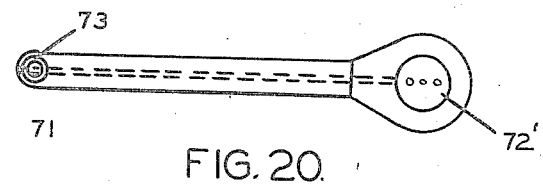
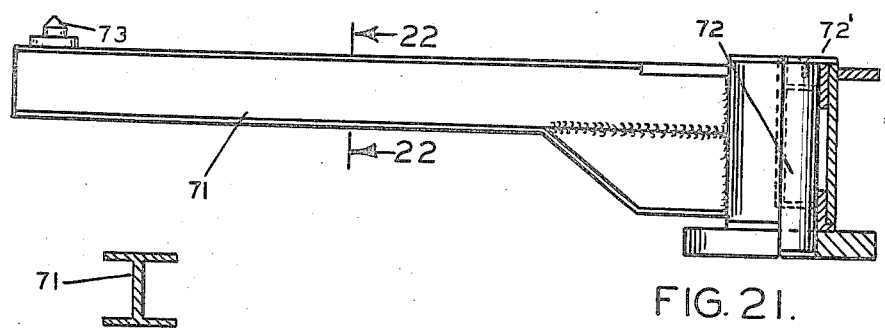

Aug. 31, 1948.    J. J. WALLACE    2,448,335
ACCOMODATION LADDER FOR SHIPS
Filed June 27, 1945    6 Sheets-Sheet 5

INVENTOR.
John J. Wallace
BY John H. Buckman
Attorney

Aug. 31, 1948.          J. J. WALLACE                2,448,335
              ACCOMODATION LADDER FOR SHIPS
Filed June 27, 1945                          6 Sheets-Sheet 6

INVENTOR.
John J. Wallace
BY John H. Ruckman
Attorney

Patented Aug. 31, 1948

2,448,335

UNITED STATES PATENT OFFICE 2,448,335

ACCOMMODATION LADDER FOR SHIPS

John J. Wallace, New Orleans, La., assignor to Hepinstall Steel Works, Inc., New Orleans, La.

Application June 27, 1945, Serial No. 601,792

3 Claims. (Cl. 228—54)

My invention relates to accommodation ladders for ships that afford a means by which persons may board and leave the ship. When a ship is tied up to a pier it rises and falls with the tides relative to the pier. Also when a ship is being unloaded and loaded it rises and settles in the water. This causes the distance between the main deck level and the pier level or water line to be variable. Previous to this invention, the accommodation ladders were of constant length and in order for them to span the variable distance between the two levels, the angle of the ladder with the vertical would change. This changing of the ladder angle is undesirable, because the steps were seldom ever level, making the ladder hazardous to use.

Another disadvantageous feature in the prior ladders is that they were of heavy solid wood construction making them heavy and cumbersome to handle. The solid construction presented solid surfaces to the pounding of waves that not only caused the ladder to pitch and sway but also often resulted in damage to the ladder. A still further objectional feature of prior ladders is the time consuming operation involved in rigging the ladder over the side for use and in stowing the ladder when the ship is being made ready for sea.

An object of the present invention is to provide a ladder that may be extended and retracted as the distance between the two levels changes, whereby the angle of the ladder with the vertical may be maintained constant and whereby the steps will always remain level.

Another object of the present invention is to provide a ladder that is largely of open construction, comparatively light in weight, easy to handle and more stable when subjected to pounding waves.

Another object of the present invention is to provide an improved means and structure whereby the ladder may easily and quickly be moved from one position of use to another position of stowage.

Fig. 3 is a top plan view of the ladder showing by full lines the ladder in horizontal position and by dotted lines showing the ladder in its stowed position.

Fig. 4 is a top plan view on an enlarged scale showing the rotatable platform and its pivotal means of attachment to the deck of the ship.

Fig. 5 is an enlarged plan view of one of the rollers shown in the circle 5 on Fig. 4.

Fig. 6 is a side view of the roller looking in the direction of the arrow 6 on Fig. 5.

Fig. 14 is a side elevational view of the ladder sections showing the means for guiding one ladder section on the other.

Fig. 15 is a sectional view taken on the line 15—15 of Fig. 14.

Fig. 16 is a fragmentary plan view of one of the ladder steps.

Fig. 17 is a fragmentary side elevational view of the upper end of the upper ladder section.

Fig. 18 is an end elevational view of the drum used to retract the ladder.

Fig. 19 is a side elevational view partly in section of the drum shown in Fig. 18.

Fig. 20 is a top plan view of the jib beam used for supporting the free ends of the retracted ladder during the time they are being moved to and from the stowed position.

Fig. 21 is an enlarged side elevational view partly in section of the jib beam of Fig. 20.

Fig. 22 is a sectional view taken on line 22—22 of Fig. 21.

Figure 1:
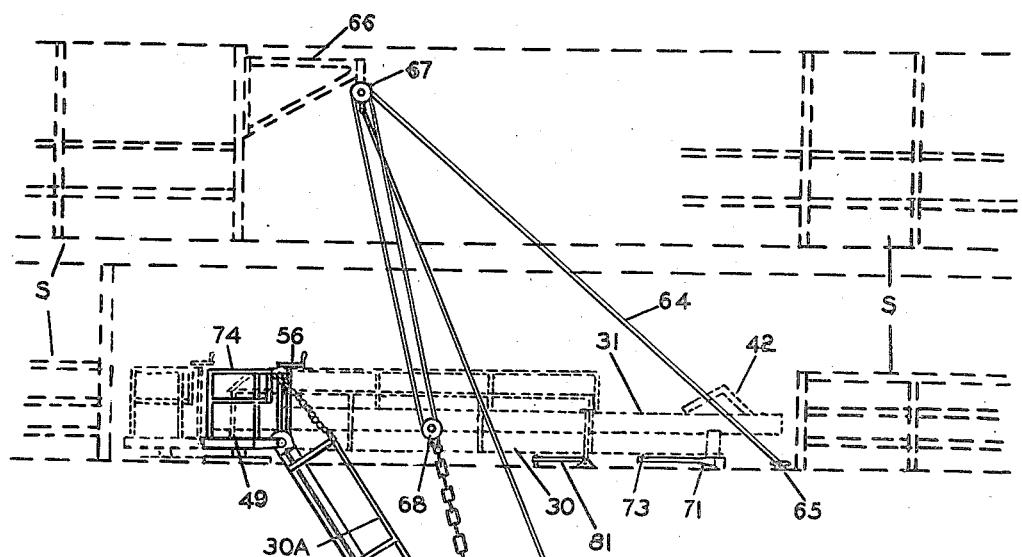
Fig. 1 is a side elevational view showing the ladder by full lines in a fully extended rigged position and by dotted lines in retracted and stowed position on deck.
Figure 2:
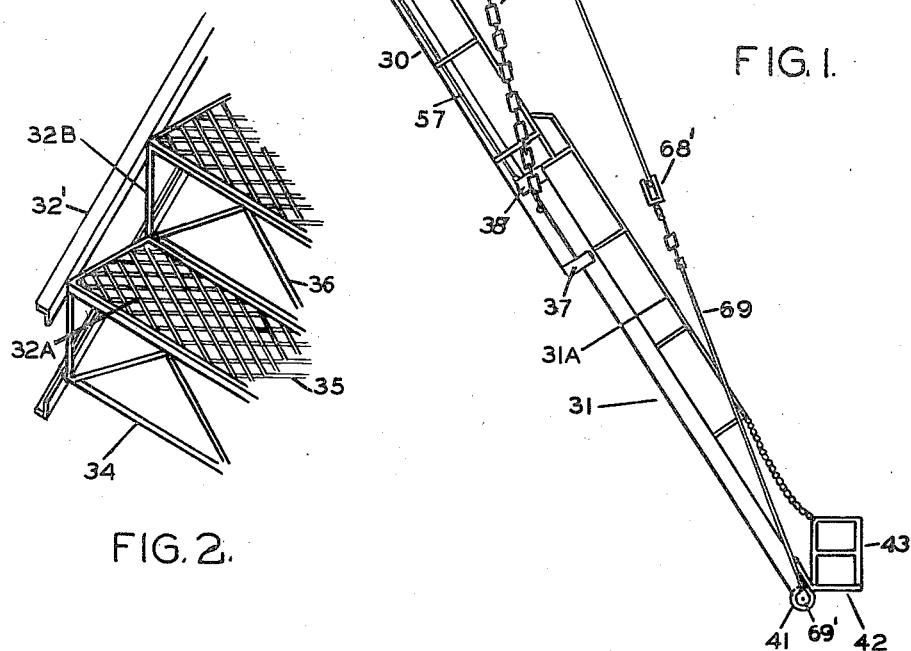
Fig. 2 is a fragmentary isometric view of the steps of the ladder showing the open construction.
Figure 7:
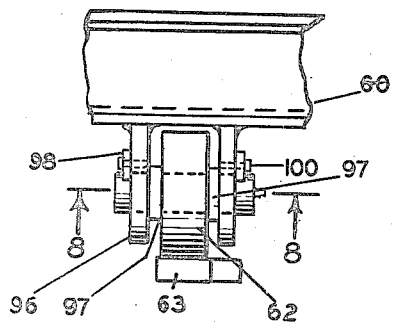
Fig. 7 is an end view of the roller looking in the direction of the arrow 7 on Fig. 5.
Figure 8:
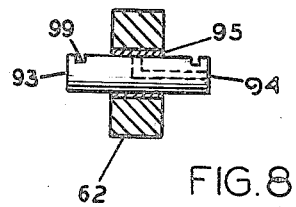
Fig. 8 is a sectional view of the roller taken on line 8—8 of Fig. 7.
Figure 9:
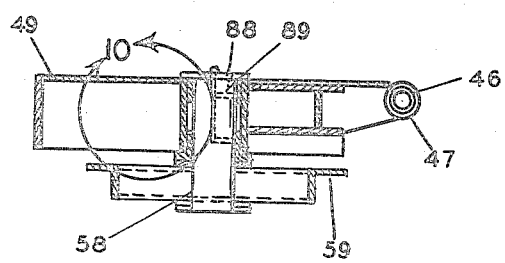
Fig. 9 is a sectional view of the rotatable platform taken on line 9—9 of Fig. 4.
Figure 10:
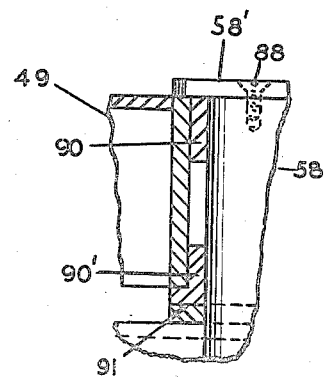
Fig. 10 is an enlarged sectional view of the pivotal bearing of the rotatable platform shown in the circle on Fig. 9.
Figure 12:
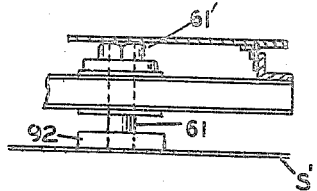
Fig. 12 is a fragmentary sectional view of the swinging platform taken on line 12—12 of Fig. 4.

Referring to Fig. 1, the letter "S" indicates a portion of the ship, shown in outline by the dashed lines. An accommodation ladder is shown rigged over the side in the position it would assume in use. The ladder proper, is constructed in two sections 30 and 31. As shown in Fig. 14, the lower section is mounted on the top of the upper section 30 for movement longitudinally thereof. Each ladder section is similarly constructed and a description of the structural details of one section will suffice for both. A pair of angle bars 32 shown in Fig. 2 constitute the top and bottom of the side rails. The flanges of the top bar extend outwardly and downwardly. The flanges of the bottom bar extend outwardly and upwardly towards the top bar. As shown, the upwardly and downwardly extending flanges are in the same plane. The top outwardly extending flange of the top section and the bottom outwardly extending flange of the lower section act as guide rails in the telescopic arrangement of the sections to be later described. The steps for the ladder are constructed from angle bars forming the boundary members upon which an expanded metal tread is welded. The end boundary members are welded as shown to the upwardly and downwardly extending flanges. The risers for the step consist of a pair of strut members 36 and a pair of end members 32B. The end members 32B are welded to the upwardly and downwardly extending flanges and with the end members 32B act as struts for the side rails to form a truss-like side rail. The lower ends of the struts 36 are welded to the lower angle bar and the upper ends thereof are welded to the midpoint of the front member of the step. This structure provides for strength and rigidity of the ladder sections while at the same time keeps the weight of the ladder sections to a minimum. Further it will be noted that there is no solid area against which the waves can pound to cause the ladder to pitch and sway when rigged for use.

As heretofore mentioned the distance between the upper deck level and the pier or the water line is variable. The angle of the steps relative to the side rails are fixed. It is therefore necessary that the side rails or the ladder sections be maintained at a angle with the vertical that is at all times constant. The structure shown in Fig. 14 is adapted for extending the ladder whereby the angle of the ladder with the vertical can at all times be kept the same.

The lower ends of the side rails of section 30 are each fitted with an upwardly extending plate 37 carrying at their upper end a pair of spaced rollers that engage the upper and lower side of the outwardly extending flanges of the lower angle bar of section 31. The upper ends of the side rails of section 31 are each fitted with a downwardly extending plate 38 carrying at their lower ends a pair of spaced rollers 40 that engage the upper and lower sides of the outwardly extending flanges of the top angle bar of section 30. The rollers 39 and 40 are so positioned as to maintain a slight clearance between the sections 30 and 31. The rollers 39 and 40 act to maintain the alignment of the sections and at the same time keep the friction opposing movement of the lower section 31 relative to the upper section to a minimum. The lower end of the ladder section 31 is provided at its lower portion with a pair of rollers 41 adapted to engage the top surface of a pier. These rollers 41 support a part of the weight of the free end of the ladder while at the same time permitting relative movement of the ladder with respect to the pier. A conventional hinged platform 42 is connected to the lower end of section 31. The lower platform 42 is floored with an expanded metal in the same manner as the steps and is provided with an integral hand rail 43.

Each ladder section is constructed with a hand rail that is welded solidly thereto. The section 30 is provided with spaced outwardly extending plates. The hand rail 30a is welded to these plates to thus provide a clearance between the side rails and the hand rails to permit free movement of the rollers 39 and 40. The hand rail 31a for the section 31 is welded to the top side of the top angle bar 33. As clearly shown in Fig. 15, the hand rails do not interfere with the relative movements of the sections 30 and 31.

Figure 23:
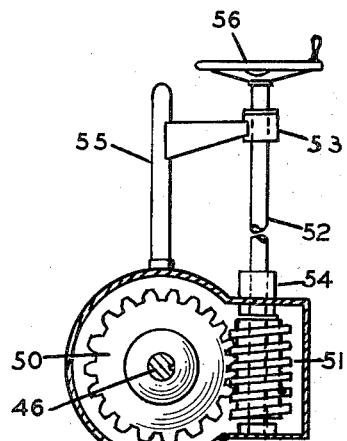
Fig. 23 is a sectional view of the gearing used for rotating the drums and taken on line 23—23 of Fig. 4.

Referring to Figs. 4, 9, 17, and 27, the top end of the ladder section 30 is connected to the rotatable platform 49. The side rails of section 30 terminate at their upper ends in an enlargement 44 having a plate portion with a bore 44' for engaging a shaft 46 and a cylindrical flanged portion that acts as a casing for the drums 45. Welded to the platform 49 are a plurality of brackets 48 that include a bearing 47 at their outer ends. A shaft 46 extends through the bearings and the bore 44' of the enlargement to form a hinged connection between the ladder section 30 and the platform 49. The drums 45 are keyed to the shaft 46 within the cylindrical portions of the enlargements 44, whereby rotation of the shaft will cause the drums to rotate therewith. The drums 45 are each connected by a cable 57 to the plates 38 at 57' as shown in Fig. 14. The inboard end of the shaft 46 is extended to enter a housing supported by the platform 49 wherein a worm wheel 50 is keyed thereto as shown in Fig. 23. The worm wheel 50 meshes with a worm gear 51 integral with shaft 52 journaled in a bearing 53 supported by a bracket on a post 55, extending upwardly from the aforementioned casing. The upper end of the shaft 52 is provided with a hand wheel 56 whereby the drums 45 may be manually rotated in either direction to adjust the length of the extension ladder from the main deck level.

The rotatable platform 49 is constructed in the form of a wheel, having a pivot pin 58 engaged by hub bearings 90 and 90' as shown in Figs. 4, 9, 10, 13 and 27. The hub portion is connected by spoke members to a rim member in the nature of a flange. The top of the platform is floored with expanded metal in the same manner as the steps. This platform is rotatable about the pin 58 whereby the ladder may extend from the side of the ship at any angle desired. The pin 58 is supported upon the outer end of a swinging platform 59 which in turn is itself pivoted to a pin 61 welded to the deck of the vessel. The platform 59 is fabricated from angle bars which form the borders of the platform or frame. The top of the frame is floored with expanded metal that is supported at spaced intervals by rods welded to the frame and extending therebetween. The frame member is supported on a pair of spaced channel bars which is welded to the underside of the frame members. Between the channel bars and intermediate the frame members are a pair of plates. One plate is welded to the underside of the channel bars and the other plate is welded to the top side of the channel bars and are provided with a central bore. The bore of these plates engage the pin 61. A nut 61' is screw threaded to the top end of the pin to prevent the platform 59 from being lifted off the pivot.

Figure 13:
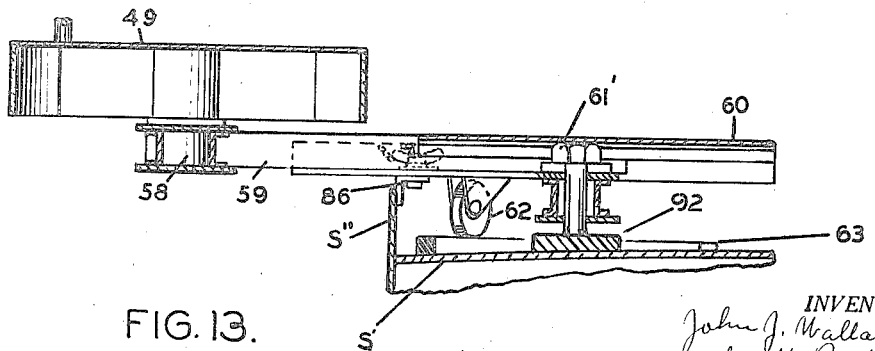
Fig. 13 is a sectional view of the upper rotatable platform and the swinging platform taken on line 13—13 of Fig. 4.

The intermediate section of the platform 59 is stiffened by the addition of an angle bar welded to the sides of the frame. The deck has welded thereto in a concentric relation to the pin 61 a track member 63 consisting of metal strap of varying thickness as shown in Fig. 13 to form a surface that will lie in a plane at right angles to the axis of the pin 61. The frame side members have downwardly extending brackets 96 welded thereto to carry rollers 62 that engage upon and roll upon the track 63, as clearly shown in Figs. 5, 6, 7 and 8. It will thus be seen that the platform 59 may be swung about the pivot pin 61 from a position parallel to the side of the ship to a position at right angles to the side of the ship. It will also be seen that in the former position the rotatable platform 49 will be inboard of the side of the ship and in the later position will be outboard of the side of the ship.

Figure 11:
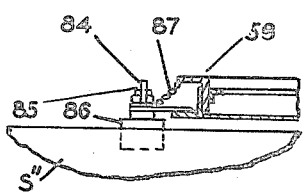
Fig. 11 is a fragmentary view, partly in section taken on line 11—11 of Fig. 4.

Referring to Figs. 1, 20, 21 and 22 a jib beam is fabricated from an I-beam and provided with a bearing member that engages upon and pivots about a pin 72 welded to the deck of the ship at a point spaced longitudinally of the ship. The pin 72 is spaced from the side of the ship the same distance as the pin 61 is spaced from the side of the ship. The outer end of the jib beam 71 carries a pivot pin 73 adapted to engage in a socket in the underside of the ladder section 30. The length of the jib beam from the axis of the pin 73 to the axis of the pin 72 is made equal to the distance between the axis of the pivot pin 61 and the axis of the pivot pin 58 of the platform 49. When the ladder is retracted and raised to a horizontal position along side the ship the jib beam is swung outwardly to engage the socket in the underside of the ladder section 30. The jib beam in this position then supports the entire weight of the ladder at its free end. By reason of the pivotal arrangements of the jib beam and the platforms 49 and 59, a slight force applied longitudinally of the ladder will cause it to swing inboard into a position parallel to the side of the ship where it is to be stowed while the ship is under way. Similarly, a slight force applied at right angles to the ladder when in its stowed position will cause it to swing outboard into a position from where it may easily and quickly be lowered to its rigged position. Figs. 11 and 13 show a means for securing the platform 59 in the position at right angles to the side of the ship. This means consists of a bracket 86 welded to the side of the ship adjacent the side members of the frame 59. The frame 59 is here provided with a short bar extending at right angles to the side members. The short bar and the bracket 86 are each bored to receive a bolt and a wing nut whereby the frame of the platform 59 may be secured in its outboard extending position.

The free ends of the ladder sections 30 and 31 are each connected to a bridle member which is conventional in all accommodation ladders. The bridles each carry a pulley block through which a rope may be reeved. The ship is provided with a swinging bracket at one or two deck levels above the platform 49 to which is suspended another block 67. A cleat is welded to the deck at a convenient position for securing the free end of the rope 64. As shown in Fig. 1, the rope 64 is connected at its other end to the under side of the block 67 and has two parts thereof extending to the block 68' connected to the bridle 69. In the present illustration there are four parts of the rope 64 extending to the block 68 from the block 67. By hauling upon the free end of the rope 64 to hoist the ladder into its horizontal position the ladder will be pivoted about the shaft 46 and will simultaneously be retracted. It is intended that during the hoisting operation that a seaman be stationed at the hand wheel 56 to reel in the cable 57 simultaneously with the raising of the ladder. The combined force exerted on the ladder section 31 by the bridle and the drums 45 will easily cause the ladder to be fully retracted by the time it reaches the horizontal position.

Figure 24:
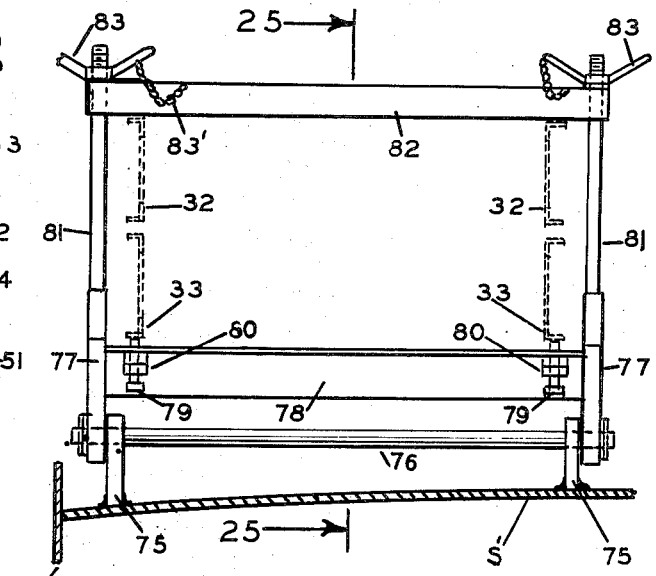
Fig. 24 is an end view of the means for securing the ladder in its stowed position.
Figure 25:
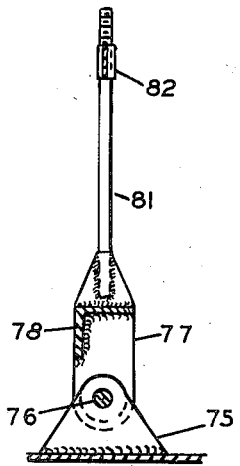
Fig. 25 is a sectional view taken on line 25—25 of Fig. 24.
Figure 26:
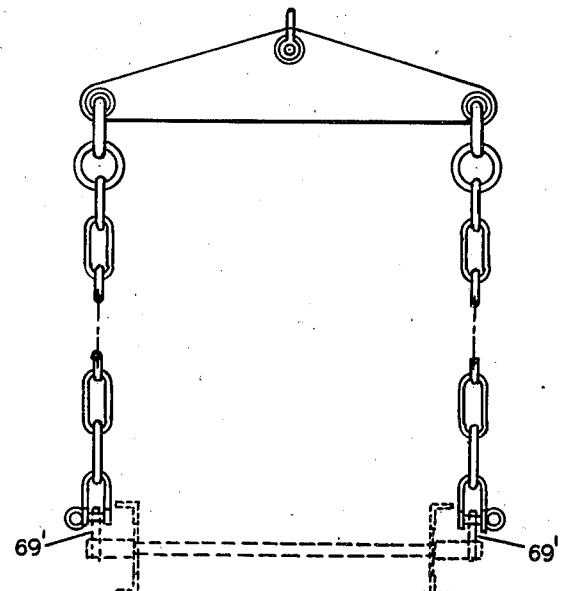
Fig. 26 is an elevational view of one of the bridle members used for supporting the free ends of the ladder sections and for hoisting them to a horizontal position.
Figure 27:
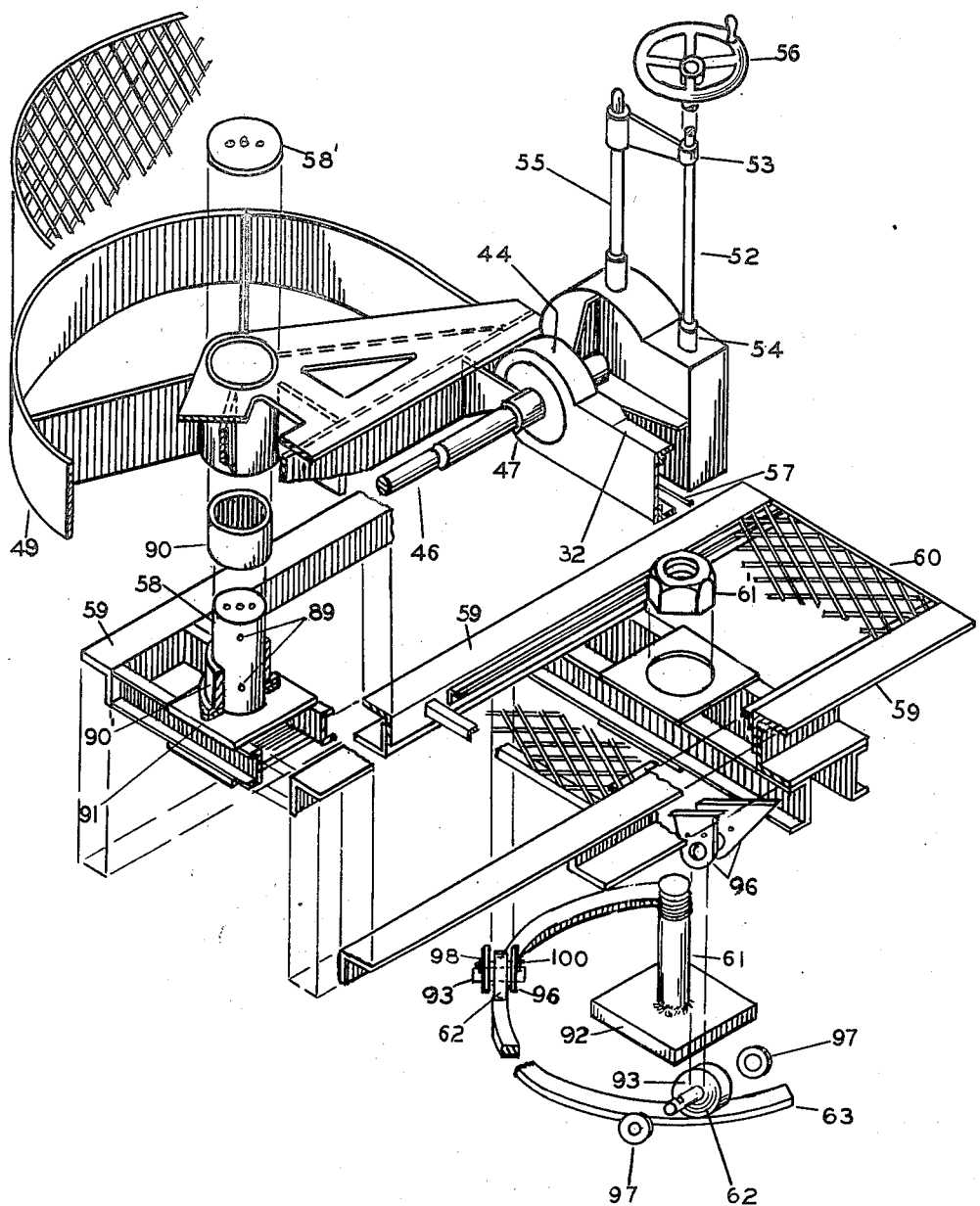
Fig. 27 is an isometric exploded view partly in section of the rotatable and swinging platforms.

Referring to Figs. 24 and 25 there is shown a means for securing the ladder sections in the stowed position on the deck. A pair of tabs are welded to the deck at 75 and carry a rod member 76 extending therebetween. A side member 77 is pivotally connected to the rod member 76 and between the side members 77 is welded an angle bar 78 adapted to engage the under side of the ladder. From the members 77 extend a rod 81 having a threaded upper end. A bar 82 having sleeve like ends is adapted to encircle the rods 81 and to rest upon the top of the ladder. Wing nuts 83 are threaded on the rods 81 to cause the bar 82 to firmly clamp the ladder section together and to the deck.

Having fully described the principal embodiment of my invention the mode of operation will now be described; referring to Fig. 1 and starting with the ladder in the position shown, it is desired that the ladder be stowed to make the ship ready to go to sea. The hauling end of the rope 64 is taken off the cleat 65 and hauled in while simultaneously the handwheel 56 is rotated to retract the ladder. The ladder will pivot about the hinged connection 46 until it reaches a horizontal position parallel to the side of the ship. The jib beam is then swung out board to engage the socket in the under side of the ladder section 30 and the ladder is lowered until the full weight of the free end of the ladder is borne by the jib beam. A force is then applied longitudinally of the ladder which will cause it to swing inboard to the stowed position. After the ladder is in the stowed position the clamping means 81 is then raised and the clamping bar is applied to secure the ladder in its stowed position.

From the foregoing description it will be seen that an accommodation ladder is provided that is more durable than previous ladders, is less liable to become damaged from the pounding of waves, is more stable and thus less dangerous to use, and is one that may be quickly and easily moved from rigged position to stowed position and vice versa.

Having fully disclosed my invention, what I consider to be new and desire to secure by United States Letters Patent is:

1. In an accommodation ladder for ships the combination of a ladder, a rotatable platform hinged to one end of said ladder at a deck level, means for raising and lowering the other end of said ladder to and from a horizontal position parallel to the side of the ship and at the deck level, a swinging platform pivoted at one end to the deck and supporting the rotatable platform at its other end, a jib beam pivoted to the deck and adapted to engage the underside of the free end of the ladder while the ladder is in its horizontal position whereby the ladder may be swung in a horizontal plane to a position over the deck for stowage.

2. The combination set forth in claim 1, and a means for securing the ladder to the deck.

3. In an accommodation ladder for ships, the combination of a ladder, a rotatable platform hinged to one end of said ladder at deck level, means for raising and lowering the other end of said ladder to and from a horizontal position parallel to the side of the ship, a swinging platform pivoted at one end to the deck and supporting said rotatable platform at its other end, and a jib beam pivoted to the deck and adapted to rotatably engage the underside of the free end of said ladder when the ladder is in its horizontal position and constituting a link connection, said rotatable platform and swinging platform constituting a second link connection for the ladder whereby it may be moved by parallel motion onto the deck for storage thereon.

JOHN J. WALLACE.

REFERENCES CITED

The following references are of record in the file of this patent:

UNITED STATES PATENTS

| Number | Name | Date |
|---|---|---|
| 175,150 | Pfautz | Mar. 21, 1876 |
| 558,361 | DeWitt | Apr. 14, 1896 |
| 1,867,904 | Bessler | July 19, 1932 |

FOREIGN PATENTS

| Number | Country | Date |
|---|---|---|
| 20,427 | Great Britain | Sept. 14, 1906 |
| 22,933 | Great Britain | Oct. 25, 1904 |